(12) United States Patent
Hwu et al.

(10) Patent No.: US 10,001,564 B2
(45) Date of Patent: Jun. 19, 2018

(54) SYSTEM AND METHOD OF COLLABORATIVE POSITIONING CALIBRATION, AND METHOD OF DEPLOYING REFERENCE STATION

(71) Applicant: INDUSTRIAL TECHNOLOGY RESEARCH INSTITUTE, Hsin-Chu (TW)

(72) Inventors: Jing-Shyang Hwu, Zhubei (TW); Kuan-Lin Chiu, Kaohsiung (TW); Yung-Cheng Chao, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 658 days.

(21) Appl. No.: 14/062,444

(22) Filed: Oct. 24, 2013

(65) Prior Publication Data
US 2014/0184441 A1 Jul. 3, 2014

(30) Foreign Application Priority Data
Dec. 27, 2012 (TW) .............................. 101150616 A

(51) Int. Cl.
*G01S 19/41* (2010.01)
(52) U.S. Cl.
CPC ................................... *G01S 19/41* (2013.01)
(58) Field of Classification Search
CPC ........................................................ G01S 19/41
USPC ................................................... 342/357.24
See application file for complete search history.

(56) References Cited

U.S. PATENT DOCUMENTS

| | | | |
|---|---|---|---|
| 5,323,322 A | 6/1994 | Mueller et al. | |
| 5,822,429 A | 10/1998 | Casabona et al. | |
| 6,324,473 B1 | 11/2001 | Eschenbach | |
| 6,529,830 B1 * | 3/2003 | Eschenbach | G01S 19/07 342/357.24 |
| 6,714,864 B2 * | 3/2004 | Odamura | G01C 21/20 342/357.66 |
| 7,508,341 B2 | 3/2009 | Trautenberg | |
| 7,711,480 B2 | 5/2010 | Robbins | |
| 7,982,667 B2 * | 7/2011 | Vollath | G01S 19/32 342/357.23 |

(Continued)

FOREIGN PATENT DOCUMENTS

| | | |
|---|---|---|
| JP | 2004301598 A | 10/2004 |
| TW | 200507479 | 2/2005 |

OTHER PUBLICATIONS

Taiwan Patent Office, Notice of Allowance, Patent Application Serial No. TW101150616, dated Jul. 17, 2014, Taiwan.

(Continued)

*Primary Examiner* — Frank J McGue
(74) *Attorney, Agent, or Firm* — Rabin & Berdo, P.C.

(57) ABSTRACT

An embodiment disclosed a system for collaborative positioning calibration, comprising at least one reference station and at least one client. The reference station uses a known position and a satellite signal transmitted by at least one satellite to compute a pseudo-range difference of the reference station position and the satellite position, and then broadcasts an area calibration data including at least one pseudo-range difference to at least one client. Based on the area calibration data, the client computes at least one pseudo-range calibration data and outputs a calibrated position of global positioning system.

14 Claims, 7 Drawing Sheets

(56) References Cited

U.S. PATENT DOCUMENTS

| | | | | |
|---|---|---|---|---|
| 8,193,979 B2* | 6/2012 | McBurney | ............. | G01S 19/03 |
| | | | | 342/357.4 |
| 2006/0282216 A1 | 12/2006 | Robbins | | |
| 2010/0039320 A1* | 2/2010 | Boyer | .................... | G01S 19/46 |
| | | | | 342/357.29 |

OTHER PUBLICATIONS

C.J. Comp, P. Axelrad, "Adaptive SNR-based carrier phase multipath mitigation technique", IEEE Transactions on Aerospace and Electronic Systems, 1998/01, p. 264-p. 276.

C.J. Comp, P. Axelrad, P.F. Macdoran, "SNR-based multipath error correction for GPS differential phase ", IEEE Transactions on Aerospace and Electronic Systems, Apr. 1996, p. 650-p. 660.

Eun-Kyu Lee, Soon Y. Oh, and Mario Gerla, "RFID Assisted Vehicle Positioning in VANETs", Pervasive and Mobile Computing, Apr. 2012, p. 167-p. 179.

J.K. Ray, Me. Cannon, R Fenton, "GPS code and carrier multipath mitigation using a multiantenna system", IEEE Transactions on Aerospace and Electronic Systems, Jan. 2001, p. 183-p. 195.

G. Lachapelle, P. Alves, L.P. Fortes, M.E. Cannon, "DGPS RTK Positioning Using a Reference Network", ION GPS, Sep. 2000, p. 1165-p. 1171.

Wubbena, G., A.Bagge, G.Seeber, V. Boder, P. Hankemeier, "Reducing Distance Dependent Errors for Real? Time Precise DGPS Applications by Establishing Reference Station Networks", ION GPS, 1996, p. 1845-p. 1852.

N. Alam, A.T. Balaei, A.G Dempster, "Positioning Enhancement with Double Differencing and DSRC", ION GPS, 2010.

* cited by examiner

SYSTEM AND METHOD OF COLLABORATIVE POSITIONING CALIBRATION, AND METHOD OF DEPLOYING REFERENCE STATION

CROSS-REFERENCE TO RELATED APPLICATION

The present application is based on, and claims priority form, Taiwan Patent Application No. 101150616, filed Dec. 27, 2012, the disclosure of which is hereby incorporated by reference herein in its entirety.

TECHNICAL FIELD

The disclosure generally relates to system and method of collaborative positioning calibration, and method of deploying reference station.

BACKGROUND

The Global Position System (GPS) is a wide-spread use to provide global position for navigation and developed by satellite triangulation positioning principle. The GPS has capable of broadcasting the satellites' coordinates in the air and the clock times. A receiver unit of the GPS that is mounted on the ground can calculate the distance from a satellite to the receiver by measuring the transmission time of the satellite radio signal. By calculating aforementioned information, e.g. distance and coordinate of each satellite, the receiver unit can obtain three-dimensional (3D) space coordinate and get two possible position ranges. By synchronizing to a fourth satellite, the receiver unit can detect the time difference and decide the final one from two possible positions.

The pseudo-range differential is the most commonly used calibration method. The reference stations are set up to observe the satellites. Reference station has a known coordinate. According to the given coordinate of the reference station and the coordinate of satellite, the real distances between the reference station and satellite can be computed. The reference station also measures the distance of the pseudo-range. Thus, the correction of pseudo-range (pseudo-range difference) can be calculated.

The Differential Global Positioning System (DGPS) is proposed and planned to improve the pseudo-range difference. The principle of DGPS adopts the observation of reference station of known coordinates and no far from the receiver as a calibrator. The calibrator and the receiver receive GPS satellite signals simultaneously. The calibration is computed by the calibrator according to known latitude and longitude. Thus, the neighboring client that receives the calibration message will get meter-level accuracy. In municipal complex environment, for example urban, the multipath interference difference will not be the same at different geographical position

SUMMARY

The exemplary embodiments of the present disclosure provide a system including methods of collaborative positioning calibration and deploying reference station.

According to the exemplary embodiment of the present disclosure, a collaborative positioning calibration system comprising: at least one reference station deployed in an area, configured to receive a satellite signal transmitted from at least one satellite, use a known position to compute a pseudo-range difference to said satellite, and broadcast an area calibration data includes said pseudo-range difference, and at least one client, configured to receive a satellite signal of said satellite, compute a pseudo-range to said satellite, calibrate said pseudo-range based on said pseudo-range difference and output a calibrated position.

According to another exemplary embodiment of the present disclosure, a collaborative positioning calibration method comprising: receiving signal of at least one satellite and a known position to compute a pseudo-range difference between at least one reference station and said satellite; broadcasting at least one area calibration data includes said pseudo-range difference to at least one client; and computing a pseudo-range between said client and said satellite, calibrating said pseudo-range based on said pseudo-range difference and outputting a calibrated position.

According to another exemplary embodiment of the present disclosure, a method of deploying reference station comprising: collecting a return data of at least one client in an area; aggregating a signal to noise ratio (SNR) of different time for each satellite in said area; and analyzing and deciding a deploying position of a reference station in said area.

DETAILED DESCRIPTION OF THE EXEMPLARY EMBODIMENTS

Figure 1:
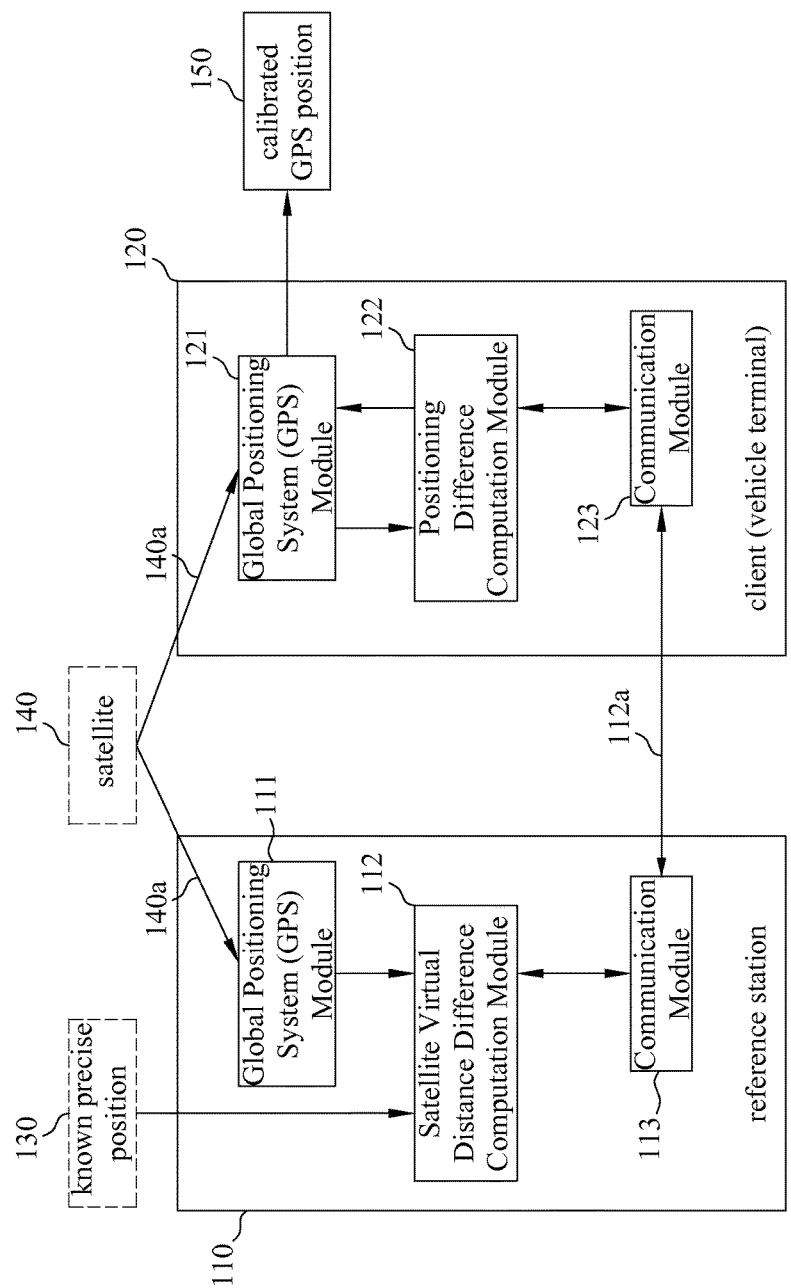
FIG. 1 illustrates a schematic view for system of collaborative positioning calibration, according to an exemplary embodiment.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

The exemplary embodiment of the present disclosure provides system and method of collaborative positioning calibration and method of deploying reference station. By analyzing distribution of multipath interference in an area, the deployed reference station may become a real-time DGPS calibration, and the obtained positioning calibration value may reflect the real local situation. Through aggregation, the disclosure may provide more pseudo-range correction value to solve the multipath interference difference due to traditional differential global positioning system in such as urban complex environment.

FIG. 1 illustrates a schematic view for system of collaborative positioning calibration, according to an exemplary embodiment. As shown in FIG. 1, the exemplary embodiment of system of collaborative positioning calibration includes at least one reference station 110 and at least one client 120. In an exemplary embodiment, the reference station 110 has deployed in the city, and the reference station 110 has known the position 130 of itself. When the client 120 located in urban complex environments performs positioning with at least one satellite 140, the reference station 110 near the client 120 also perform positioning with the satellite 140, the reference station 110 and the client 120 may perform positioning in a similar environment, the reference station 110 may transmit calibration information of multipath interference difference caused by the environment to the client 120, thus the client 120 may perform positioning calibration. The reference station 110 further includes a global positioning system (GPS) module 111 configures to receive satellite signals 140a of the satellite 140, a satellite pseudo-range difference computation module 112, and a communication module 113. The client 120 further includes a GPS module 121 configures to receive satellite signals 140a of the satellite 140, a positioning difference computation module 122, and a communication module 123. The communication module 113 and 123 may be an internal or external communication module. The communication module 113 and 123 are internal means the internal communication module 113 and 123 are configured into the reference station and the client, as described in FIG. 1. Also the communication module 113 and 123 are external means not configured into the reference station and the client. In an exemplary embodiment, the reference station 110 may be a server, in another exemplary embodiment, the reference station 110 may be a hardware device similar to the client 120 to reduce the costs of the reference station 110. In an exemplary embodiment, the client 120 may be a vehicle terminal installed in the vehicle.

In the reference station 110 of an exemplary embodiment, the satellite pseudo-range difference computation module 112 uses the position 130 and receives a satellite signal 140a of a satellite 140 transmitted by a global positioning system module 111, to compute pseudo-range difference between the position of the reference station 110 and the position of the satellite 140. The communication module 113 broadcasts an area calibration data 112a including the pseudo-range difference to at least one client 120.

In the client 120 of an exemplary embodiment, the positioning difference computation module 122 receives the area calibration data 112a transmitted by the communication module 123, and receives a satellite signal 140a of a plurality of satellite 140 transmitted by the GPS module 121. The signal to noise ratio (SNR) of a plurality of satellite signal 140a is compared with a SNR of the area calibration data 112a received from the reference station 110, to compute a correction value. The positioning difference computation module 122 based on the pseudo-range of the client 120 and the satellite 140 subtracting the correction value to obtain calibrated pseudo-range information, and the global positioning system module 121 of the client 120 outputs a calibrated position 150. Wherein the area calibration data 112a includes at least one satellite number, pseudo-range of the satellite, and signal noise ratio (SNR) of the satellite.

Figure 2:
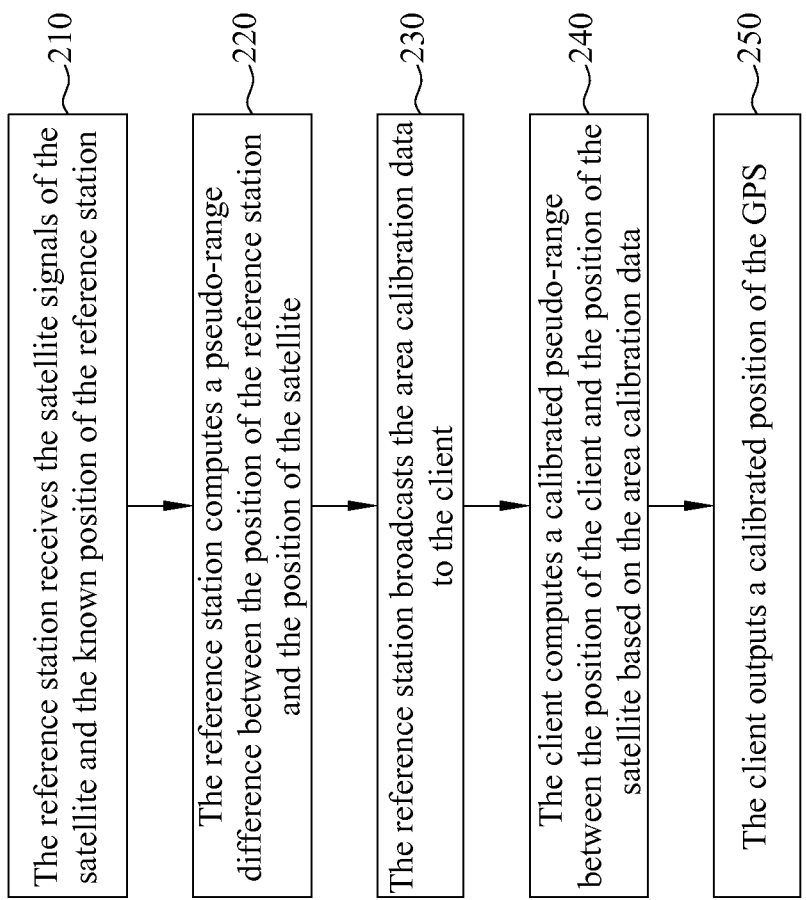
FIG. 2 illustrates a schematic flow chart for method of collaborative positioning calibration, according to an exemplary embodiment.

FIG. 2 illustrates a schematic flow chart for method of collaborative positioning calibration, according to an exemplary embodiment. Refer to FIG. 1 and FIG. 2, the exemplary embodiment of a positioning calibration method comprising: the reference station 110 receives the satellite signals 140a of the satellite 140 and the known position 130 of the reference station (step 210); next, the reference station 110 computes a pseudo-range difference between the position of the reference station and the position of the satellite (step 220); then, the reference station 110 broadcast the area calibration data to the client 120 (step 230); the client 120 computes a calibrated pseudo-range between the position of the client and the position of the satellite based on the area calibration data (step 240); finally, the client 120 outputs a calibrated position of the global positioning system (step 250).

In an exemplary embodiment, the client 120 receives the broadcasted area calibration data from a plurality of reference stations 110. Thus in step 240, the client 120 may assign weight distribution to the plurality of reference station based on the comparison result of the received SNR of the satellite and received SNR of the plurality of reference station 110 to the corresponding satellite, to compute the pseudo-range calibration value of the satellite according to the weight and area calibration data, in order to obtain a calibrated pseudo-range. The weight distribution for the reference station 110 is explained in following.

Figure 3:
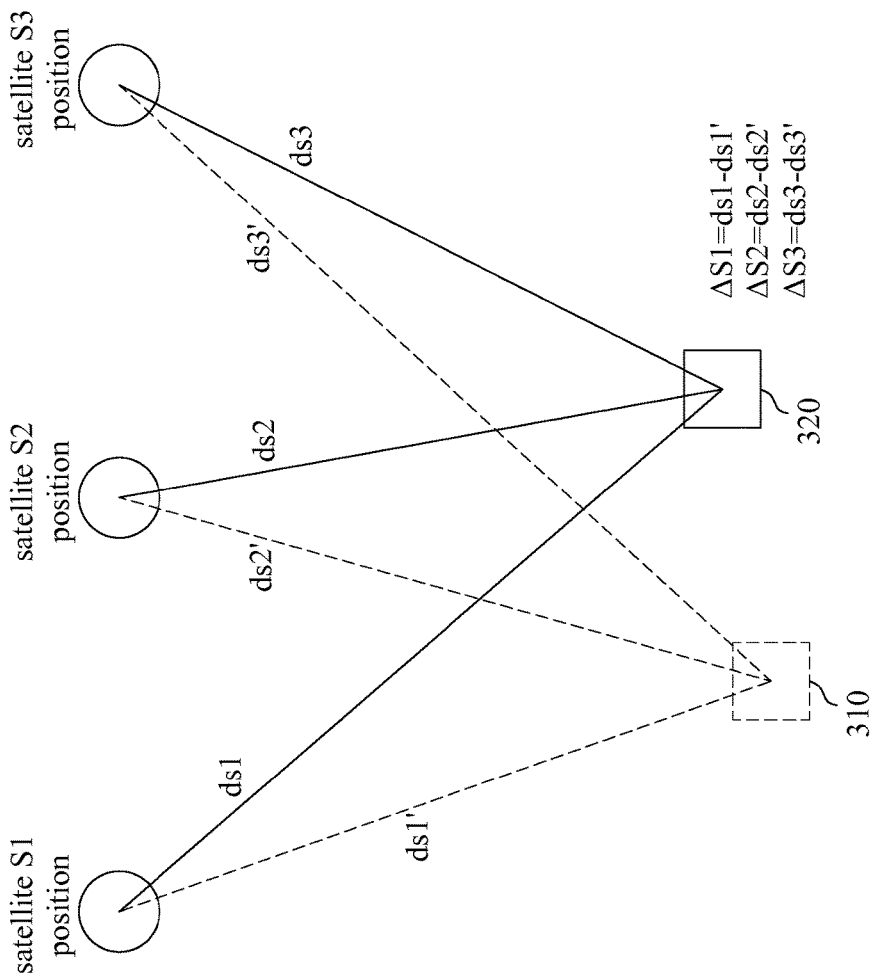
FIG. 3 illustrates a schematic view of how to compute the pseudo-range difference and calibrated pseudo-range, according to an exemplary embodiment.

FIG. 3 illustrates a schematic view of how to compute the pseudo-range difference and the calibrated pseudo-range, according to an exemplary embodiment. As shown in FIG. 3, the GPS 310 of the reference station computes the pseudo-range between the position of each satellite (i.e., S1, S2, S3) and the position of the reference station are ds1', ds2', and ds3' (such as shown in dashed lines), respectively, i.e., the obtained solving distance between the position of each satellite and the global positioning system 310. While the distance between the positions of each satellite S1, S2, S3 and the known position 320 are ds1, ds2, ds3 (shown in solid line), respectively, i.e. the distance between the position of the satellite and the known position. Therefore, the reference station may compute the pseudo-range ($\Delta S$) between the reference station and satellites as follows:

$$\text{pseudo-range difference } (\Delta S) = \text{true distance } (ds) - \text{pseudo-range } (ds') = \text{atmospheric difference} + \text{ephemeris difference} + \text{multipath difference}$$

For example, the pseudo-range difference between the reference station and the satellite S1 is $\Delta S1 = ds1 - ds1'$; the pseudo-range difference between the reference station and the satellite S2 is $\Delta S2 = ds2 - ds2'$; the pseudo-range difference between the reference station and the satellite S3 is $\Delta S3 = ds3 - ds3'$.

After the reference station computes the pseudo-range difference ($\Delta S$) for satellites, then broadcasts the pseudo-range difference to the client. The client uses the pseudo-range difference ($\Delta S$) and signal-to-noise ratio (SNR) to compute and generate the pseudo-range correction value (CorValue). Since the client is located near the reference station, thus the virtual position of the client to the satellite position closes to the virtual position of the reference station, therefore the formula for calibrated pseudo-range of the client is as follows:

$$\text{calibrated pseudo-range} = \text{pseudo-range} + \text{pseudo-range correction value} = \text{pseudo-range} + (\text{atmospheric/ephemeris difference} + \text{multipath difference calibration value})$$

wherein the known position 320 is a position of the reference station with prior measurement.

Figure 4A:
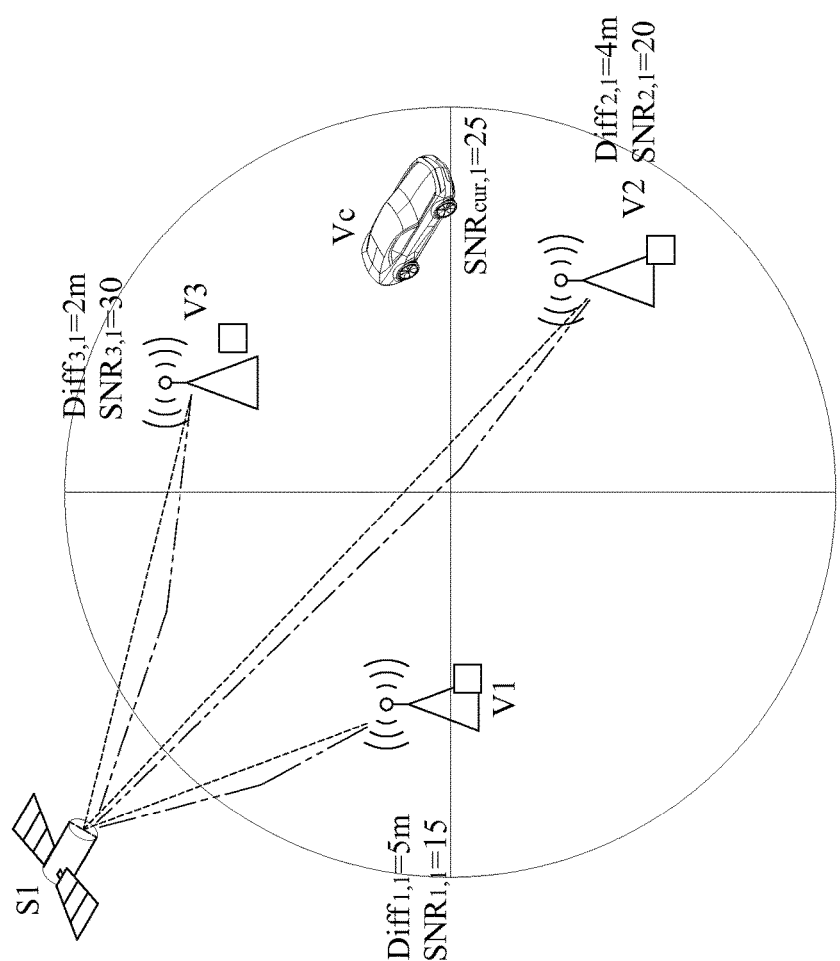
FIGS. 4A and 4B illustrate schematic view of how to compute the client position with the calibrated pseudo-range, according to an exemplary embodiment.
Figure 4B:
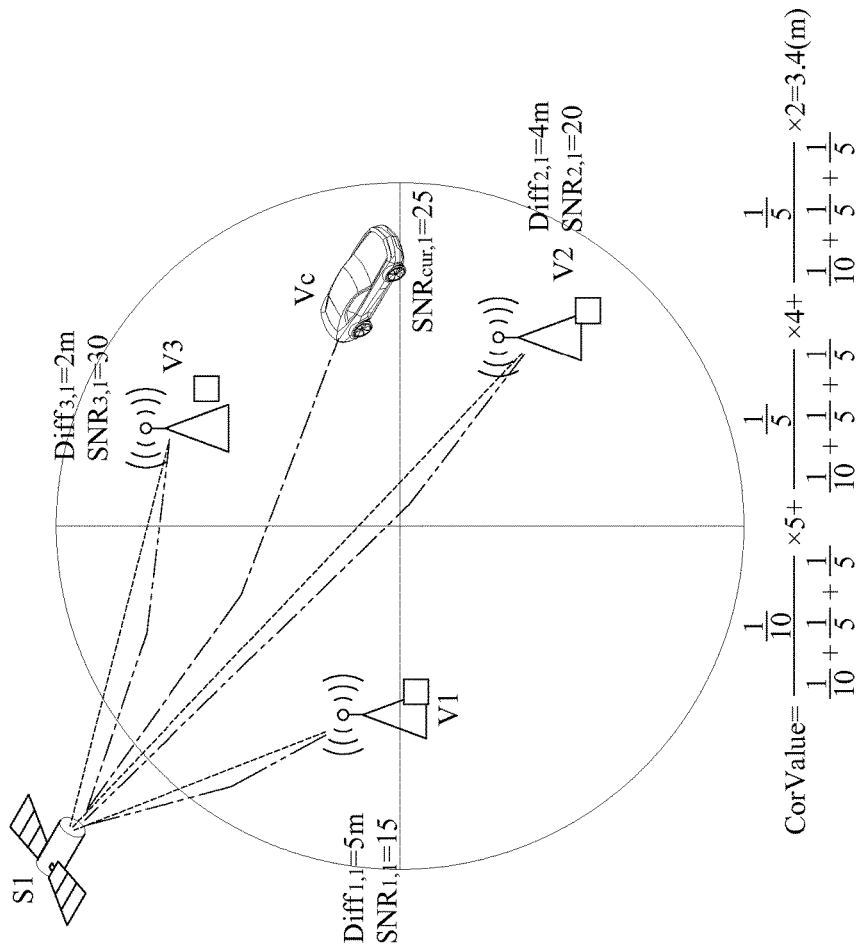

FIGS. 4A and 4B illustrate schematic view of how to compute the client position with the calibrated pseudo-range, according to an exemplary embodiment. As shown in FIG. 4A, assuming that the pseudo-range difference and the signal noise ratio (SNR) of the satellite S1 with three reference stations V1, V2, V3, are (5 m, 15), (4 m, 20), and (2 m, 30), respectively, while the SNR of the client Vc is 25. Wherein the pseudo-range difference (Diff) of reference station may be computed by the above equation. The client Vc compares the SNR of itself with SNR of reference stations, and assigns weight distribution to reference station. The computation formula of the weight is as follows:

$$Weight_{i,j} = \frac{\frac{1}{|SNR_{i,j} - SNR_{cur,j}|}}{\sum_{i=1}^{m} \frac{1}{|SNR_{i,j} - SNR_{cur,j}|}}$$

Wherein $S_j$ $Weight_{i,j}$=weight of the reference station $V_i$ receiving the satellite $S_j$ $Diff_{i,j}$=pseudo-range difference of the reference station $V_i$ receiving the satellite $S_j$ $SNR_{i,j}$=signal-to-noise ratio of the reference station $V_i$ receiving the satellite $S_j$ $SNR_{cur,j}$=signal-to-noise ratio of the client Vc receiving satellite $S_j$ i=1~m, m is an integer.

When the weight of reference station is computed, the client Vc computes the pseudo-range correction value based on the following formula:

$$CorValue_{cur,j} = \sum_{i=1}^{m} (Weight_{i,j} \cdot Diff_{i,j})$$

Wherein CorValuecur.j=pseudo-range correction value of the client Vc.

This pseudo-range correction value includes an atmospheric difference, an ephemeris difference, and multipath difference correction amount.

In an exemplary embodiment, for example in FIG. 4A and FIG. 4B, the pseudo-range correction value (CorValue) of the client Vc is computed resulting in 3.4 m. As above mentioned, such as shown in FIG. 4B, assuming the pseudo-range of the client Vc (pseudo-range)=10 m, its calibrated pseudo-range (AfterCor)=10 m−3.4 m=6.6 m.

Figure 5:
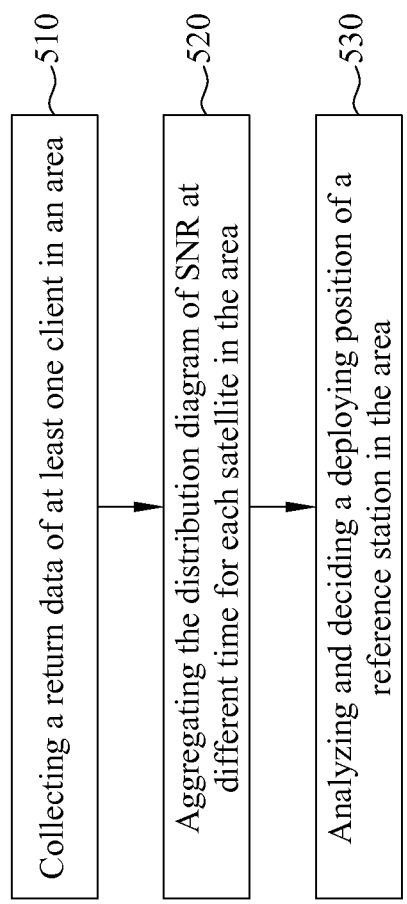
FIG. 5 illustrates a schematic view of a method of deploying reference station, according to an exemplary embodiment.
Figure 6:
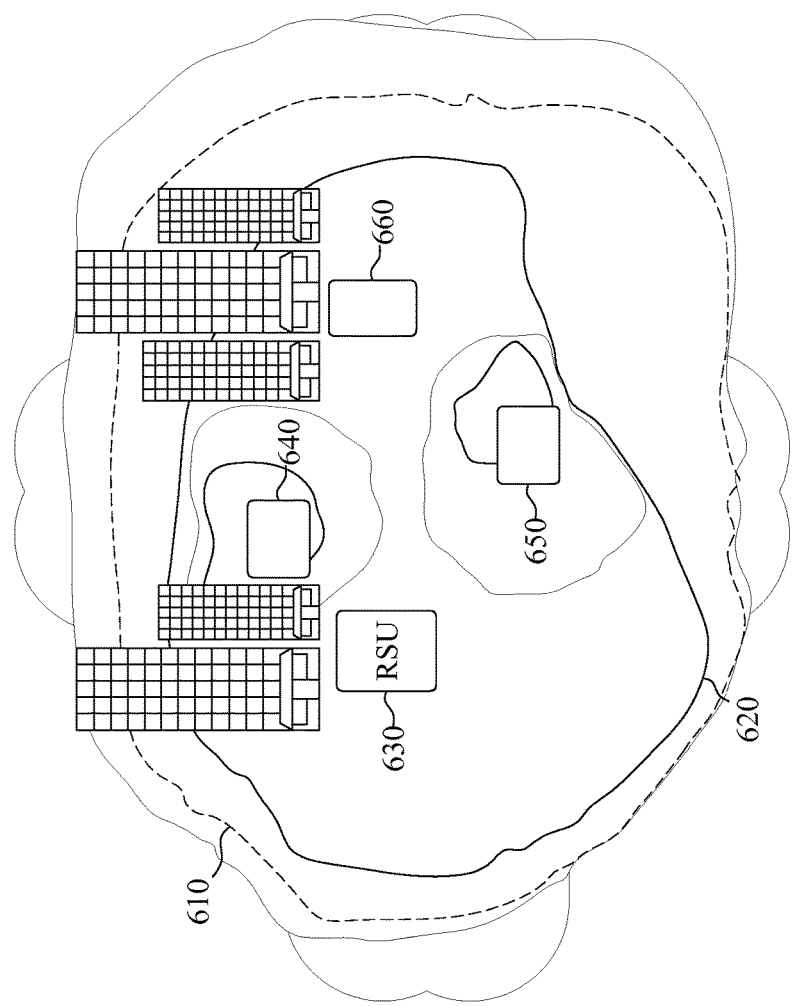
FIG. 6 illustrates a schematic diagram for an example method of deploying reference station.

FIG. 5 illustrates a schematic view of a method of deploying reference station, according to an exemplary embodiment. FIG. 6 illustrates a schematic diagram for an example method of deploying reference station. The exemplary embodiment of the present disclosure for deploying reference station is in the city complex environment. Thus the method for deploying reference station may refer to FIG. 5 and FIG. 6. The deploying method comprising: collecting a return data of at least one client in an area (step 510), wherein the return data includes a position of the client, a time, a satellite number, and a signal to noise ratio. As shown in FIG. 6, labels 610, 620 (dashed line) respectively mark a distribution diagram of SNR for satellites 1, 2 in an area, and labels 630 to 660 respectively mark the possible position of deploying reference station. The method then aggregating the distribution diagram of SNR at different time for each satellite in the area (step 520). Finally the method analyzing and deciding a deploying position of a reference station in the area (step 530). As shown in FIG. 6, analyzing a return data and aggregating the distribution diagram of SNR at different time for satellite 1, 2 at different time to decide a reference station is deployed at the position of label 630 in the area.

In summary of the disclosure, the disclosed exemplary embodiments provide a collaborative positioning calibration system and method and reference station deploying method. It uses SNR of satellite signals to determine the degree of multipath interference, and through aggregating the pseudo-range and SNR of return data of deployed reference stations, to filter out atmospheric/ephemeris difference and the multipath difference correction value for satellites, and through broadcasting the area calibration data to nearby mobile client, the client uses SNR of satellite signals received by Global Positioning System to compute the multipath difference correction amount, and calibrates the measured pseudo-range with correction amount of atmospheric/ephemeris difference.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A collaborative positioning calibration method, the method comprising the steps of:
   receiving a satellite signal of at least one satellite and a known position of each of a plurality of reference stations;
   computing a plurality of pseudo-range differences, each of which is computed based on the known position and a computed position of each of the reference stations computed according to the satellite signal;
   broadcasting an area calibration data to at least one client;
   computing a calibrated pseudo-range between each of the client and the satellite according to a pseudo-range correction value of the client, wherein the pseudo-range correction value is a linear combination of a plurality of weights and the pseudo-range differences, and each of the weights is negatively related to a difference between a signal-to-noise ratio (SNR) value of each of the reference stations and a SNR of the client; and
   outputting a calibrated position.

2. The method as claimed in claim 1, wherein the area calibration data further comprises at least one satellite number.

3. The method as claimed in claim 1, wherein each of the pseudo-range differences is a distance obtained by subtracting a pseudo-range from a true distance between one of the reference stations and the satellite.

4. The method as claimed in claim 1, wherein each of the pseudo-range differences is a difference obtained by adding together an atmospheric difference, an ephemeris difference and a multipath difference.

5. The method as claimed in claim 1, wherein each of the pseudo-range differences is a distance between the client and the satellite, and the distance is computed by a global positioning system.

6. The method as claimed in claim 3, wherein each of the true distances is a distance between the known position of one of the reference stations and the satellite.

7. The method as claimed in claim 1, wherein each of the reference stations is a server.

8. The method as claimed in claim 1, wherein the client is a vehicle terminal.

9. A client device, comprising:
a global positioning system (GPS) module configured to receive a satellite signal of at least one satellite;
a communication module configured to receive a plurality of pseudo-range differences from a plurality of reference stations and an area calibration data, wherein each of the pseudo-range differences is computed based on a known position of each of the reference stations and a computed position of each of the reference stations computed according to said satellite signal; and
a computation module configured to compute a calibrated pseudo-range between each of the client device and the satellite according to a pseudo-range correction value of the client device, wherein the pseudo-range correction value is a linear combination of a plurality of weights and the pseudo-range differences, and each of the weights is negatively related to a difference between a signal-to-noise ratio (SNR) value of each of the reference stations and a SNR of the client device.

10. The client device as claimed in claim 9, wherein the client device is a vehicle terminal.

11. The client device as claimed in claim 10, wherein the area calibration data further comprises at least one satellite number.

12. The client device as claimed in claim 9, wherein each of the reference stations is a server.

13. The client device as claimed in claim 9, wherein the area calibration data further comprises at least one satellite number.

14. One of the reference stations for calibrating the client device as claimed in claim 9, each of the reference stations comprising:
a GPS module configured to receive a satellite signal of at least one satellite;
a computation module configured to compute each of the pseudo-range differences based on a known position of each of the reference stations and a computed position of each of the reference stations computed according to the satellite signal; and
a communication module configured to broadcast the pseudo-range differences to the client device.

* * * * *